United States Patent
Bastioli et al.

(10) Patent No.: US 6,787,613 B2
(45) Date of Patent: Sep. 7, 2004

(54) TERNARY MIXTURE OF BIODEGRADABLE POLYESTERS AND PRODUCTS OBTAINED THEREFROM

(75) Inventors: Catia Bastioli, Novara (IT); Gianfranco Del Tredici, Sesto Calende (IT); Italo Guanella, Romentino (IT); Roberto Ponti, Oleggio (IT)

(73) Assignee: Novamont S.p.A., Novara (IT)

( * ) Notice: Subject to any disclaimer, the term of this patent is extended or adjusted under 35 U.S.C. 154(b) by 0 days.

(21) Appl. No.: 10/057,606

(22) Filed: Jan. 25, 2002

(65) Prior Publication Data

US 2002/0188071 A1 Dec. 12, 2002

(30) Foreign Application Priority Data

Jan. 25, 2001 (IT) ..................................... TO2001A0058

(51) Int. Cl.⁷ .............................................. C08L 67/00
(52) U.S. Cl. .......................... 525/411; 525/444; 524/47
(58) Field of Search ................................ 525/411, 444; 524/47

(56) References Cited

U.S. PATENT DOCUMENTS 5,883,199 A    3/1999  McCarthy et al.

6,521,717 B1 * 2/2003 Itoh ............................ 525/444

FOREIGN PATENT DOCUMENTS

| EP | 0 327 505 A2 | 8/1989 |
| EP | 0 400 532 A1 | 12/1990 |
| EP | 0 965 615 A1 | 12/1990 |
| EP | 0 950 678 A1 | 10/1999 |
| EP | 0 980 894 A1 | 2/2000 |
| EP | 0 990 676 A1 | 4/2000 |
| WO | 90/10671 | 9/1990 |
| WO | 92/19680 | 11/1992 |
| WO | 99/8367 | 6/1999 |
| WO | 00/55236 | 9/2000 |

* cited by examiner

*Primary Examiner*—Patricia A. Short
(74) *Attorney, Agent, or Firm*—Connolly Bove Lodge & Hutz, LLP

(57) ABSTRACT

The invention relates to a mixture of biodegradable polyesters which includes an aromatic-aliphatic polyester (A), an aliphatic polyester (B) and a polyactic acid polymer (C) in which the concentration of A varies, with respect to (A+B) in the range between 40 and 70% by weight, and the concentration of C with respect to (A+B+C) is of between 6 and 30% by weight.

27 Claims, No Drawings

TERNARY MIXTURE OF BIODEGRADABLE POLYESTERS AND PRODUCTS OBTAINED THEREFROM

DESCRIPTION

The present invention relates to mixtures of biodegradable polyesters which include at least three polyesters in proportions whereby it is possible to provide biodegradable film with improved characteristics compared to the individual initial polyesters and demonstrating, in particular, properties of considerable strength, both longitudinally of and transverse the direction of the formation of the film, transparency and rigidity.

Film manufactured from such mixtures will prove particularly useful in food packaging, for mulching, for silage and in various other applications.

THE PRIOR ART

Conventional polymers such as low or high-density polyethylene are characterised not only by excellent flexibility and water resistance, but also by a good level of transparency and by excellent resistance to tearing. These polymers are used, for example, for sacks and bags, as packaging material and as film for agricultural mulching. However, their poor biodegradability has caused a problem of visual pollution which has steadily worsened over the past few decades.

Polymers such as L-polylactic, D,L-polylactic or D-polylactic acid and copolymers thereof are thermoplastic materials which are biodegradable, come from a renewable source, are transparent and have excellent resistance to mould and are thus well suited to packaging food products, contributing to preserving the organoleptic qualities thereof These materials, however, break down only slowly in the soil and, if composted, decompose only at high temperatures. However their main drawback is that the thin film obtained under normal conditions, by either the blown or cast methods, has a low tear resistance. In addition, these films are very stiff and thus unsuitable for mulching, for making food packaging bags, bin liners or other packaging films which do, however, require considerable strength.

The aliphatic polyesters, on the other hand, which are mainly constituted by monomers from renewable sources, based on diacids and diols, such as polymers of sebacic, brassylic or azelaic acid, for example, have the huge disadvantage of being highly anisotropic, with regard to resistance to both longitudinal and transverse tearing, and also show extremely poor resistance to longitudinal tearing. These characteristics also make film produced from these resins unsuitable for use in mulching, in food packaging or for bin liners and the like.

Polyhydroxy-acids, such as poly-ε-caprolactone, also have a typical tendency to a transverse orientation.

In order to maintain biodegradable characteristics conforming with the CEN 13432 method, biodegradable aliphatic-aromatic polymers, in particular polymers with the aromatic portion constituted by terephthalic acid and the aliphatic portion constituted by diacid diols, and/or hydroxy acids, with a C2–C20 aliphatic chain, either branched or not (possibly chain extended with isocyanates, anhydrides or epoxides) and, in particular, polymers based on terephthalic acid, adipic acid and butandiol, must contain quantities of terephthalic acid (as moles of the total acid) not exceeding 55% and preferably not exceeding 50%. Examples of this type of material include Ecoflex by BASF or Eastarbio by Eastman, which are strong but with extremely low moduli, of the order of 100 MPa or less.

Binary compounds of polylactic acid and aliphatic polyesters have formed the object of numerous patents. In particular, the Patent EP-0 980894 A1 (Mitsui Chemical) describes a significant improvement in tear resistance and in the balance of mechanical properties in film manufactured from mixtures of polylactic acid and polybutylenesuccinate, with the addition of a plasticizer.

However the films described are not transparent and have fairly low strengths, of the order of 120 g according to the JIS P8116 method. In addition, the presence of a plasticizer limits use of the film in contact with food products and, since it ages rather quickly, for use as an agricultural mulch.

The U.S. Pat. No. 5,883,199 describes binary compounds of polylactic acid and polyesters, with a polylactic acid content of between 10 and 90% and with the polyester forming either a continuous or co-continuous phase. The tear resistance of the compounds described here is very poor, however.

Object, characteristics and advantages of the invention

Starting from the need to find a biodegradable material which combined the two properties of transparency and tear resistance, it was a surprise to find that if the three different types of polyester described (lactic acid polymers, aliphatic polyester derived from diacids/diols and aromatic aliphatic polyester) were combined in specific ratios, there was a critical compositional range in which it was possible to achieve resistance to tearing in both directions, comparable to that of conventional plastics materials such as polyethylene, moduli of elasticity with values found between those of low and high-density polyethylene. It was found, even more surprisingly, that it was possible for the transparency of the ternary mixture of polyesters of the invention to be comparable to that of the individual component materials, even when drawn.

DESCRIPTION OF THE INVENTION

The invention relates to a mixture of biodegradable polyesters which includes:

(A) an aromatic-aliphatic polyester with a melting point of between 50 and 170° C. and preferably of between 80° and 120° C.;

(B) an aliphatic polyester with a molecular weight Mw greater than 40,000, and preferably>60,000 and a melting point of between 50° and 95° C., preferably of between 55° and 85° C., and even more preferably of between 57° and 80° C.;

(C) a polylactic acid polymer containing at least 75% of L-lactic or D-lactic acid or a combination thereof, with a molecular weight Mw greater than 30,000;

in which the concentration of A varies, with respect to (A+B), in the range between 40% and 70% by weight, and the concentration of C with respect to (A+B+C) is of between 6 and 30%, preferably of between 10 and 25% by weight.

More in particular, in the mixture of the invention:

(A), the aromatic-aliphatic polyester, is biodegradable according to the CEN13432 standard, it has (at T=23° and Relative Humidity=55%) a modulus which is less than 150 MPa, lengthens to breaking point by more than 500% for blown film with a thickness of 25–30 μm, tested within three days from production;

(B), the aliphatic polyester, preferably a diacid/diol type, has (at T=23° C. and Relative Humidity=55%) a modulus of elasticity of between 200 and 900 MPa and lengthens to breaking point by more than 200%, for blown film with a thickness of 25–30 μm, tested within three days of production;

(C), the polylactic acid polymer, has a modulus of more than 1,500 MPa.

The mixture of biodegradable polyesters of the invention is obtained in a process which is carried out in a two-screw or one-screw extruder at a temperature of between 100 and 200° C., either by a one-step method or a method involving separate steps of mixing and then film forming.

In the event of film forming being separate from the mixing operation, it is carried out by means of conventional machinery for polyethylene extrusion (high or low density), at a heat in the range of 100 to 200° C., preferably of 140 to 197° C. and more preferably of 185 to 195° C., with a blowing ratio normally in the range of 1.5–5 and a drawing ratio of between 3 and 100, preferably 3 and 25 and produces film with a thickness of between 5 and 50 μm.

Films of the invention, with a thickness of between 25–30 μm, show a tear resistance in both directions, according to the Elmendorf test, of between 15 and 100 N/mm, preferably of between 20 and 90 N/mm and even more preferably of between 25 and 80 N/mm, with a ratio of transverse to longitudinal Elmendorf values of between 3.5 and 0.4, and preferably of between 2.5 and 0.5. Such films have a modulus of between 150 and 800 MPa, preferably of between 250 and 750 MPa and prove biodegradable both in soil and when composted. Such films are also characterised by transparency, understood as transmittance at the entrance port measured on the HAZEGUARD SYSTEM XL-211 in the range between 85 and 90% when formed into a film at a head temperature of between 185° and 200° C.

During the mixing step, type (A) polymers are preferred with an MFI (ASTM standard D 1238-89) of between 1 and 10 dg/min, type (B) polymers are preferred with an MFI of between 1 and 10 dg/min and (C) type polymers are preferred with an MFI of between 2 and 30 dg/min.

The type (A) polymer family comprises polyesters obtained from the reaction of mixtures which contain ($a^1$) mixtures of from 35 to 95% moles of adipic acid, or derivatives in the form of esters or mixtures thereof, from 5 to 65% moles of terephthalic acid, or ester derivatives and mixtures thereof, and from 0 to 5% moles of a sulphur-containing compound, the sum of the percentages of the various components to be 100% ($a^2$) a compound with two hydroxyl functions selected from a group consisting of C2-C6 alkandiols and C5–C10 cycloalkandiols, the molar ratio ($a^1$):($a^2$) being in the interval between 0.4:1 and 1.5:1, it being possible for the polyester to have a molecular weight Mw of between 5,000 and 50,000, a viscosity of between 30 and 350 g/mole (measured in 50:50 w/w dichlorobenzene/phenol at a concentration of 0.5% of the weight of the polyester at 25° C.) and a melting point of between 50 and 170° C., and preferably of between 90 and 120° C. It is also possible to produce the polymer using a compound with at least three groups able to form ester bonds.

The polymer (B) is preferably constituted by dicarboxylic aliphatic acids from a renewable source such as azelaic acid, sebacic acid, brassylic acid or compounds thereof and aliphatic diols, and possibly also by hydroxy acids. Examples of diacids which can be used in combination with sebacic, azelaic or brassylic acid, or mixtures thereof, are succinic, oxalic, malonic, glutaric, adipic, pimelic, suberic, undecandioic or dodecandioic acids. Those polyesters are especially preferred which contain more than 50% by mole of azelaic, sebacic or brassylic acid, or mixtures thereof, out of the total quantity of acid, with those containing more than 70% by mole being even more strongly preferred and those containing more than 90% being yet more strongly preferred.

Specific glycols are ethylene glycol, diethylene glycol, triethylene glycol, polyethylene glycol, 1,2- and 1,3-propylene glycol, dipropylene glycol, 1,3-butandiol, 1,4-butandiol, 3-methyl-1,5-pentandiol, 1,6-hexandiol, 1,9-nonandiol, 1,11-undecandiol, 1,13-tridecandiol, neopentyl glycol, polytetramethylene glycol, 1,4-cyclohexane-dimethanol and cyclohexane-diol. These compounds can be used individually and in combination.

Typical hydroxy acids include glycolic acid, lactic acid, 3-hydroxybutyric, 4-hydroxybutyric, 3-hydroxyvaleric, 4-hydroxyvaleric and 6-hydroxycaproic acid, and also cyclic esters of hydroxycarboxylic acids such as glycolide, dimers of glycolic acid, epsilon-caprolactone and 6-hydroxycaproic acid. These compounds can be used individually or in combination. All the compounds mentioned above are combined so as to form polyesters with tensile mechanical characteristics of resistance to elongation>200% and preferably>300% with a modulus of between 200 and 900 MPa for blown film at least 25–30 μm thick, with a melting point of between 50° and 95° C., preferably of between 55° and 85° C. and more preferably of between 57° and 80° C.

The type B polymers also include polyamide polyesters in which the polyester portion is as described above and the polyamide portion can be caprolactan, an aliphatic diamine such as hexamethylenediamine or even an aminoacid. The B type polyesters may also contain a quantity of less than 5% moles of aromatic diacids. Polycarbonates also belong to the type B polymers.

Biodegradable polyesters forming part of the mixture of the invention can be polymerized by polycondensation or, as in the case of glycolide and the lactones, by the open-ring method, as known in the literature. The polyesters can also be branched polymers, with the introduction of polyfunctional monomers such as glycerine, epoxidized soya oil, trimethylolpropane and the like, or of polycarboxylic acids such as butantetracarboxylic acid. In addition, chain extenders such as difunctional, trifunctional or tetrafunctional anhydrides, for example maleic, trimellitic or pyromellitic anhydride, or expoxy, aliphatic or aromatic iso-cyanates group, can be added to A type polyesters.

The material can be regraded with iso-cyanates either in its molten state, at the end of the polymerization reaction or during extrusion, or in its solid state, as described in the Patent Application Novamont WO 99/28367. The three types, A, B and C, of polymer can also have chain extenders or cross-linking agents added to them during the mixing operation.

Higher concentrations of A than those of the range reported above for the mixture of the invention involve modulus characteristics which are too low, while lower concentrations of A bring a deterioration in laceration characteristics.

Higher concentrations of B than those of the range reported above for mixtures of the invention make the film more unbalanced and less strong, while lower concentrations mean that the film is insufficiently rigid.

Concentrations of C polymer below 6% have no significant effect on the balance of tearing properties in the two directions or on adjustment of the modulus.

Material obtained by mixing the three polymers A, B and C needs no plasticizers, which cause migration problems, especially in the case of food packaging. However, quantities of plasticizer of less than 5% of the polymers (B+C) can be added.

Various other additives can be incorporated into the mixture, such as anti-oxidants, UV stabilizers, heat and hydrolytic stabilizers, flame retardants, slow-release agents or organic or inorganic fillers such as natural fibres, antistatic agents, humectant agents, colourings or lubricants, for example.

In particular, in the production of film by the blown or cast methods, silica, calcium carbonate, talc, kaolin, kaolinite, zinc oxide and various wollastonites can be added, as can, generally speaking, inorganic lamellar substances functionalized or not with organic molecules, which are able to delamellate during the mixing stage with the polymeric mixture, or with one of the individual polymers thereof, so as to form nanocompounds with improved anti-blocking and barrier properties. The various inorganic substances can be used in combination or individually. The concentration of inorganic additives is generally of between 0.05 and 70%, preferably of between 0.5 and 50% and, even more preferably, of between 1 and 30%.

In the case of natural fibres and fillers, such as cellulose, sisal, ground nuts, corn husks, rice husks, soya and the like, preferred concentrations are of between 0.5 to 70%, preferably of between 1 and 50%. It is also possible to bulk out these materials with mixed inorganic and plant matter.

Aliphatic acid amides can be added to improve the film-forming characteristics of the material, such as oleamide, stearamide, erucamide, behenamide, N-oleylpalmitamide, N-stearylerucamide and other amides, salts of fatty acids such as aluminium, zinc or calcium stearate and the like. The quantity of these additives varies between 0.05 and 7 parts, and preferably between 0.1 and 5 parts of the polymeric mixture.

The mixture thus obtained can be turned into film by blowing or by extrusion with a flat head. The transparent film is strong, can be bonded perfectly and can be produced in thicknesses of up to 5 $\mu$m, either blown or cast. The film can be made into sacks and bags for carrying goods, film and bags for food packaging, stretchable, heat-shrinkable film, film for adhesive tape, for disposable nappy tapes and for decorative coloured tape. Some other main applications are for silage, for "breathable" bags for fruit and vegetables, bags for bread and other food products, film for covering packs of meats, cheese and other food items and yoghurt pots. The film can also be bi-orientated.

Film produced with compounds of the invention can also be used as a sealable component in composite materials with at least one layer of polylactic acid or another polyester, of starch which has or has not been destructured and blends thereof with synthetic or natural polymers, or in a compound material, layered with aluminium and other materials, or can be metallized under vacuum with aluminium, silica or other inorganic materials. The layers can be produced either by co-extrusion or by laminating or by extrusion coating, provided that one layer is paper, fabric or non-woven fabric and the other is a biodegradable material or another material which will not melt at the temperatures required to extrude the film.

The film can be used for agricultural mulching, possibly with the addition of UV stabilizers, either in the form of single layer film or co-extruded with a lower-modulus film, as in the case of starch-based materials, in order to improve UV resistance and barrier properties, and to slow down the speed of decomposition in the air and in the soil.

The material thus obtained can also be used to manufacture fibre for textiles and non-woven fabric, or for fishing nets. In addition, the non-woven fabric can be used for disposable diapers, sanitary protection and the like. The fibres can also be bonded to special types of paper as reinforcement.

The material can also be used successfully to manufacture sheets for either mono-extruded or co-extruded heat forming, with other polymeric layers such as polylactic acid, other polyesters or polyamides, starch-based materials or other materials, and then heat formed into trays for food packaging, agricultural containers and the like.

Other additives can also be added to the material, such as polyethylene or polypropylene waxes, PET and PTB, polystyrene, ethylene or propylene co-polymers with functional carboxyl groups, carboxylate, methacrylate, acrylate, or hydroxy groups, or it can be combined with such polymers in co-extrusion, co-injection or similar operations. The material can be used as a matrix in a blend with destructured starch, according to methods related in Patents EP-0 327505, EP-0 539541, EP-0 400532, EP-0 413798, EP-0 965615, in which it can bond with the starch.

It can be used as a coating film for biodegradable foam materials based on polyester, polyamides made from thermoplastic starch, complex starch or simply a blend of starch with other polymers, or with the material of the present invention.

The material can also be expanded, alone or mixed with starch or with other polymers for the manufacture of containers for fruit and vegetables, meat, cheese and other food products, of fast food containers or even of foam balls which can be moulded into foam elements for industrial packaging. It can be used as a foam in the place of polyethylene foam. It can also find application in the field of textiles and non-woven fabric for clothing, hygiene and industrial products, and also for fishing nets or nets for fruit and vegetables. The mixture of biodegradable polyesters of the invention will now be described by means of some non-limitative examples.

EXAMPLES

Example 1

Polymers constituting the mixture:

50% aliphatic-aromatic polyester (A): Ecoflex 0700 BASF;

40% aliphatic polyester (B): Polybutylensebacate made of sebacic acid and butandiol with a monobutylstanoic acid catalyst, as in example 1 of WO 00/55236;

10% polylactic acid polymer (C): 4040 Cargill with a 6% D-lactic content (MFI=4 dg/min).

The polymers were mixed in an OMC extruder:

Diameter 58 mm; L/D=36; rpm=160; heat profile 60-120-160×5-155×2

Absorption=80A. Delivery=40 kg/h

Film forming on Ghioldi machine:

Diameter=40 mm, L/D=30; rpm=45; die: diameter=100 mm; air gap=0.9 mm; land=12;

Delivery 13.5 kg/h

Heat profile: 110-130-145×2; filter temperature 190×2; head temperature=190×2

Film: width=400 mm; thickness 251 $\mu$m;

The film thus obtained was subjected to the Elmendorf tear-resistance test, carried out on a Lorentzen & Wettre pendulum. The test was carried out both transversely (Ecross) and longitudinally (Elong). The ratio between the two values (Ecross/Elong) shows the level of isotropy of the film in the two directions.

Transmittance values, determined both at the source port (Tsource)and at the entrance port (Tentr), were carried out with an XL-211 HAZEGUARD SYSTEM measurer. The modulus of elasticity (E) values, breakage load (σ) and breakage elongation (ε) were determined in accordance with ASTM D 882-91 with an INSTRON 4502 instrument.

The results of the tests are reported in Table 1

Examples 2–10

While maintaining the conditions of mixture extrusion and film forming related in example 1, the percentages of the polymers constituting the mixture were varied. The results of the tests on the film thus produced are given in Table 1. In Example 10, polybutylensebacate was replaced with poly-ε-caprolactone.

The results thus obtained demonstrated how the ranges of concentration of the polymers in the mixture are crucial to the simultaneous achievement of considerable mechanical and transparency characteristics of the film, which prove so useful in countless practical applications.

Examples for Comparison

While maintaining the conditions of mixture extrusion and of film forming related in Example 1, binary mixtures were tested, which each time contained only two of the polymers constituting the mixture of the invention. The results of the tests on film thus produced are given in Table 2. In Example 3c, polybutylensebacate was replaced with poly-ε-caprolactone.

TABLE 1

| Es. | A % | B % | C % | A/ A + B | C/ A + B + C | $E_{cross}$ N/$^s$mm | $E_{long}$ N/mm | $E_{cross}$/ $E_{long}$ | $T_{source}$ % | $T_{entr}$ % | E (Mpa) | σ (MPa) | ε (%) |
|---|---|---|---|---|---|---|---|---|---|---|---|---|---|
| 1. | 60 | 30 | 10 | 66.6 | 10 | 47.8 | 81 | 0.59 | 72.7 | 89 | 527 | 36 | 458 |
| 2. | 50 | 40 | 10 | 55.5 | 10 | 44.9 | 52.4 | 0.85 | 65.2 | 89.4 | 549 | 34 | 446 |
| 3. | 45 | 45 | 10 | 50.0 | 10 | 57.5 | 20.2 | 2.84 | 64.1 | 89.6 | 511 | 36 | 490 |
| 4. | 40 | 50 | 10 | 44.4 | 10 | 49.3 | 33.1 | 1.49 | 63.5 | 89.9 | 576 | 35 | 450 |
| 5. | 50 | 30 | 20 | 62.5 | 20 | 32.5 | 37.4 | 0.86 | 61.8 | 87.0 | 776 | 32 | 354 |
| 6. | 40 | 40 | 20 | 50.0 | 20 | 37.8 | 42.9 | 0.88 | 45.5 | 87.8 | 757 | 31 | 353 |
| 7. | 20 | 40 | 40 | 33.3 | 40 | 7.4 | 9.1 | 0.81 | 41.2 | 88.5 | 1321 | 37 | 319 |
| 8. | 50 | 45 | 5 | 52.6 | 5 | 80.2 | 17.8 | 4.5 | — | — | 328 | 32 | 609 |
| 9. | 50 | 48 | 2 | 51.0 | 2 | 134 | 12 | 11.16 | — | — | 242 | 31 | 674 |
| 10 | 50 | 40 | 10 | 55.5 | 10 | 13.9 | 10.7 | 1.30 | 75.0 | 89.0 | 567 | 30 | 576 |

TABLE 2

| Es. | A % | B % | C % | $E_{cross}$ N/mm | $E_{long}$ N/mm | $E_{cross}$/ $E_{long}$ | $T_{source}$ % | $T_{entr}$ % | E (Mpa) | σ (MPa) | ε (%) |
|---|---|---|---|---|---|---|---|---|---|---|---|
| 1a | 0 | 50 | 50 | 7.1 | 6.4 | 1.1 | 68.5 | 93 | 2007 | 35 | 60 |
| 1b | 0 | 60 | 40 | 10.7 | 5.1 | 2.09 | 38.5 | 90.4 | 1464 | 36.5 | 362 |
| 1c | 0 | 40 | 60 | 7.8 | 8.6 | 0.90 | 73 | 92 | 2018 | 34 | 69 |
| 2a | 50 | 0 | 50 | 8.1 | 7.2 | 1.1 | 57.3 | 85.6 | 1416 | 39 | 394 |
| 2b | 60 | 0 | 40 | 12.8 | 7.8 | 1.64 | 36.5 | 82.1 | 1122 | 39 | 361 |
| 3a | 60 | 40 | 0 | 194 | 6.98 | 27.8 | 65 | 87 | 215 | 42 | 499 |
| 3b | 50 | 50 | 0 | 219 | 6.14 | 35.7 | 75 | 93 | 245 | 41 | 452 |
| 3c | 50 | 50 | 0 | 246 | 8 | 30.8 | 80 | 90 | — | — | — |
| 3d | 30 | 70 | 0 | 84.8 | 7 | 12.1 | — | — | 281 | 42 | 426 |

What is claimed is:

1. A mixture of biodegradable polyesters which includes:
A. an aromatic-aliphatic polyester with a melting point of between 50° and 170° C.;
B. an aliphatic polyester with a molecular weight Mw greater than 60,000 and a melting point between 50° and 95° C.;
C. A polylactic acid polymer which contains at least 75% of L-lactic or D-lactic acid, or combinations thereof, with a molecular weight Mw greater than 30,000, in which the concentration of A varies with respect to (A+B) in the range of between 40 and 70% by weight, and the concentration of C with respect to (A+B+C) is of between 6 and 30%.

2. A mixture of biodegradable polyesters according claim 1 in which the concentration of C with respect to (A+B+C) is of between 10 and 25% by weight.

3. A mixture of biodegradable polyesters according to claim 1, in which the aliphatic polyester (B) is a diacid/diol obtained from an aliphatic diacid from renewable source and makes up more than 50% in moles of the total diacid content.

4. A mixture of biodegradable polyesters according to claim 3 in which the dicarboxylic aliphatic diacid is selected from azelaic, sebacic or brassylic acid and makes up more than 50% in moles of the total diacid content.

5. A mixture of biodegradable polyesters according to claim 1 in which the aliphatic polyester (B) is poly-epsilon-caprolactone or co-polymers thereof.

6. A mixture of biodegradable polyesters according to any one of claims 1–5, in which the modulus of the aromatic-aliphatic polyester (A) is less than 150 MPa and its elongation to breaking is greater than 500% for film with a thickness of between 25–30 μm produced by the blown method.

7. A mixture of biodegradable polyesters according to any one of claims 1–5 in which the modulus of elasticity of the aliphatic polyester (B) is of between 200 and 900 MPa and its elongation to breaking is greater than 200%, for film with a thickness of between 25–30 μm produced by the blown method.

8. A mixture of biodegradable polyesters according to claim 7, in which the elongation to breaking of the aliphatic polyester (B) is greater than 300%.

9. A mixture of biodegradable polyesters according to any one of claims 1–5 in which the modulus of the polylactic acid polymer (C) is greater than 1,500 MPa.

10. A mixture of biodegradable polyesters according to claim 1, in which:
the aromatic-aliphatic polyester (A) has a modulus of less than 150 MPa, elongation to breaking of more than 500% for film with a thickness of 25–30 μm, produced by the blown method;

the aliphatic polyester (B) has a modulus of elasticity between 200 and 900 MPa, elongation to breaking of more than 200%, for film with a thickness of 25–30 μm, produced by bubble forming; and the polylactic acid polymer (C) has a modulus greater than 1,500 MPa.

11. A mixture of biodegradable polyesters according to claim 10, in which the elongation to breaking of the aliphatic polyester (B) is greater than 300%.

12. A mixture of biodegradable polyesters according to any one of claims 1–5, and 11 which the aromatic-aliphatic polyester is biodegradable according to standard CEN13432.

13. A mixture of biodegradable polyesters according to any one of claims 1–5, and 11 in which the melting point of the aromatic-aliphatic polyester (A) is of between 80° and 120° C.

14. A mixture of biodegradable polyesters according to any one of claims 1–5 and 11 which the melting point of the aliphatic polyester (B) is of between 55 and 85° C.

15. A film produced from mixtures of biodegradable polyesters according to any one of claims 1–5, 10 and 11.

16. A film according to claim 15, characterized by tear resistance in both directions, according to the Elmendorf test, of between 15 and 100 N/mm.

17. A film according to claim 16, characterized in that the ratio of transverse to longitudinal tear resistance, according to the Elmendorf test, is of between 3.5 and 0.4.

18. A film according to claim 15, characterized by tear resistance in both directions, according to the Elmendorf test, of between 20 and 90 N/mm.

19. A film according to claim 15, characterized by tear resistance in both directions according to the Elmendorf test, of between 25 and 80 N/mm.

20. A film according to claim 19 in the form of food packaging, for containing organic residue and for agricultural mulching.

21. A film according to claim 15, characterized in that the modulus value is of between 150 and 800 MPa.

22. A film according to claim 15, characterized in that the modulus value is of between 250 and 750 MPa.

23. Compact sheet manufactured with a mixture according to any one of claim 1–5, 10 and 11 for food containers, containers for seedlings and industrial containers in general.

24. Foam sheet manufactured with a mixture according to any one of claims 1–5, 10 and 11 for food and other containers and for industrial packaging.

25. Fibers manufactured with a mixture according to anyone of claims 1–5, 10 and 11 for textiles and non-woven fabrics used in the hygiene, fashion and industrial sectors.

26. A coating material comprising a mixture according to any one of claims 1–5, 10 and 11, for application to paper, textiles, non-woven fabrics or other layers of compact or expanded biodegradable material.

27. A mixture of biodegradable polyesters according to any one of claims 1–5, 5, 10 and 11 in combination with destructed starch, natural starch or modified starch, wherein the starch is in a complex or not complex dispersed phase.

* * * * *